United States Patent
Balasubramanian et al.

(10) Patent No.: US 11,917,578 B2
(45) Date of Patent: Feb. 27, 2024

(54) IDENTIFYING SIDELINK RESOURCES THROUGH SIDELINK PAGING

(71) Applicant: QUALCOMM Incorporated, San Diego, CA (US)

(72) Inventors: Anantharaman Balasubramanian, San Diego, CA (US); Junyi Li, Fairless Hills, PA (US); Shuanshuan Wu, San Diego, CA (US); Gabi Sarkis, San Diego, CA (US); Sudhir Kumar Baghel, Pleasanton, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/184,781

(22) Filed: Mar. 16, 2023

(65) Prior Publication Data

US 2023/0224855 A1  Jul. 13, 2023

Related U.S. Application Data

(62) Division of application No. 17/232,617, filed on Apr. 16, 2021, now Pat. No. 11,627,551.

(Continued)

(51) Int. Cl.
*H04W 68/00* (2009.01)
*H04W 64/00* (2009.01)
*H04W 72/044* (2023.01)

(52) U.S. Cl.
CPC ......... *H04W 68/005* (2013.01); *H04W 64/00* (2013.01); *H04W 72/044* (2013.01); *H04W 74/0808* (2013.01)

(58) Field of Classification Search
None
See application file for complete search history.

(56) References Cited

U.S. PATENT DOCUMENTS

2015/0382324 A1* 12/2015 Sheng ............... H04W 72/02 370/329
2020/0100215 A1* 3/2020 Li ................. H04W 74/002
(Continued)

FOREIGN PATENT DOCUMENTS

WO   2021013337 A1   1/2021
WO   2021102144      5/2021

OTHER PUBLICATIONS

3GPP TS 36.300: "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG2, No. V16.1.0, Mar. 31, 2020, XP051893975, pp. 1-386.

(Continued)

*Primary Examiner* — Suhail Khan
(74) *Attorney, Agent, or Firm* — Patterson & Sheridan LLP

(57) ABSTRACT

Certain aspects of the present disclosure provide a method for wireless communications between a first UE and a second UE. The method includes, at the first UE, receiving, from the second UE, a paging indication message on a sidelink channel, the paging indication message associating the first UE with one or more resources of a common resource pool that includes a plurality of resources for communication on the sidelink channel. The method further includes, based on the received paging indication message, monitoring the one or more resources for a message from the second UE.

19 Claims, 10 Drawing Sheets

Related U.S. Application Data

(60) Provisional application No. 63/012,731, filed on Apr. 20, 2020.

(56) References Cited

U.S. PATENT DOCUMENTS

2020/0374857 A1  11/2020  Zeng et al.
2021/0329590 A1  10/2021  Balasubramanian

OTHER PUBLICATIONS

Apple: "Considerations on NR V2X Mode 2 Resource Allocation Mechanism", 3GPP Draft, 3GPP TSG RAN WG1 #97, R1-1907335, Considerations on NR V2X Mode 2 Resource Allocation Mechanism, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728774, 6 Pages, the whole document.

International Search Report and Written Opinion—PCT/US2021/027846—ISA/EPO—dated Jul. 26, 2021.

Qualcomm: "NR Sidelink Communication Resource Selection", 3GPP TSG RAN WG2 #109e, 3GPP Draft, R2-2001578, 3rd Generation Partnership Project (3GPP), Mobile Competence Centre, 650, Route Des Lucioles, F-06921 Sophia-Antipolis, France, vol. RAN WG2, No. E-meeting, Mar. 2, 2020-Mar. 6, 2020, Feb. 14, 2020 (Feb. 14, 2020), 2 Pages, XP051849873, the whole document, paragraph [0075], paragraph [0087]-paragraph [0099].

\* cited by examiner

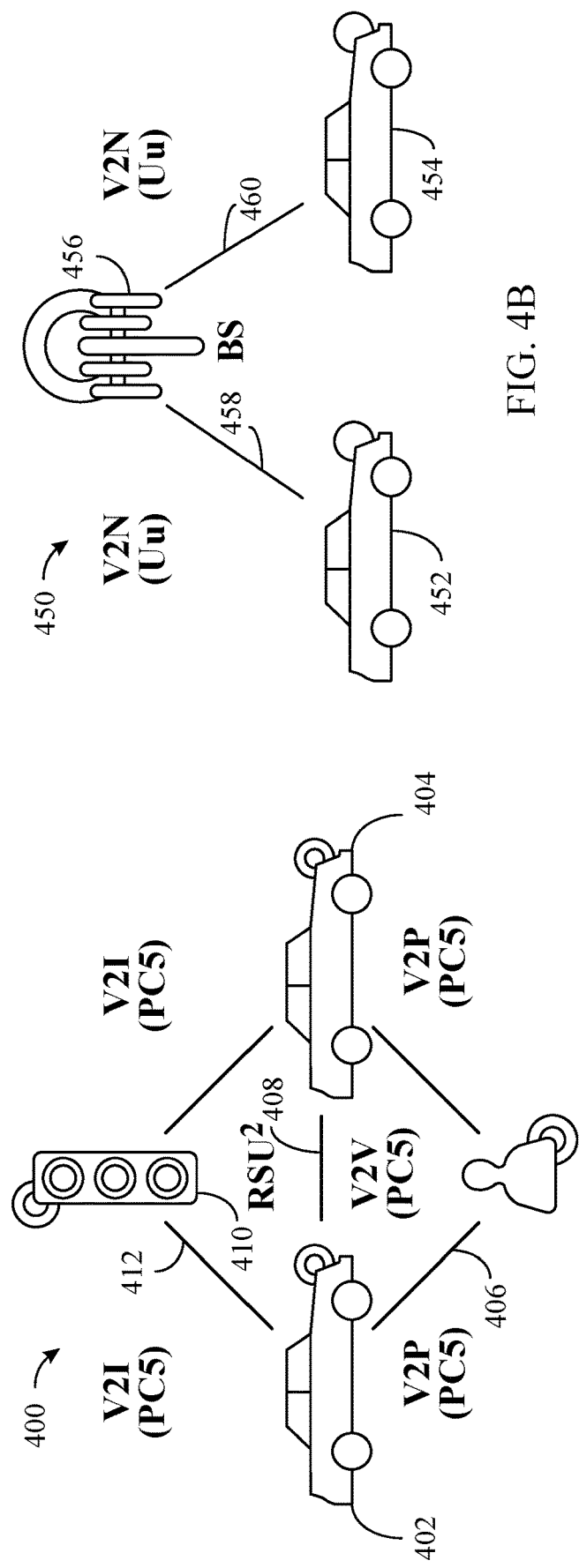
FIG. 4A
FIG. 4B
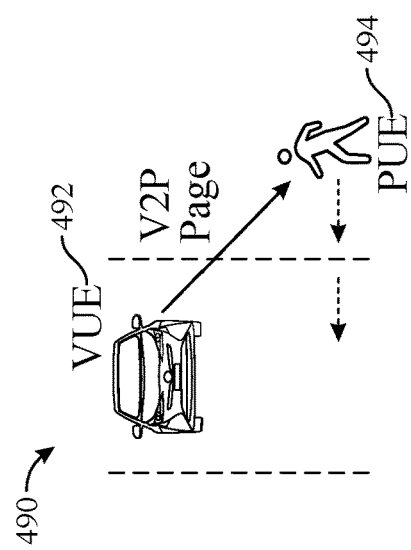
FIG. 4C

IDENTIFYING SIDELINK RESOURCES THROUGH SIDELINK PAGING

CROSS-REFERENCE TO RELATED APPLICATIONS

This application is a divisional application of U.S. application Ser. No. 17/232,617 filed Apr. 16, 2021, which claims benefit of and priority to U.S. Provisional Application No. 63/012,731, filed Apr. 20, 2020, which are assigned to the assignee hereof and hereby expressly incorporated by reference herein in their entirety as if fully set forth below and for all applicable purposes.

BACKGROUND

Field of the Disclosure

Aspects of the present disclosure relate to wireless communications, and more particularly, to techniques for identifying resources for sidelink communications through sidelink paging.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved identification of sidelink resources for sidelink communications.

Certain aspects of the subject matter described in this disclosure can be implemented in a method for wireless communication between a first user equipment (UE) and a second UE. The method generally includes, at the first UE, receiving, from the second UE, a paging indication message on a sidelink channel, the paging indication message associating the first UE with one or more resources of a common resource pool comprising a plurality of resources for communication on the sidelink channel. The method further includes, based on receiving the paging indication message, monitoring the one or more resources for a message from the second UE.

Certain aspects of the subject matter described in this disclosure can be implemented in a method for wireless communication between a first user equipment (UE) and a second UE. The method generally includes, at the first UE, receiving, from the second UE, a paging indication message on a sidelink channel, the paging indication message associating the first UE with one or more resources of a common resource pool comprising a plurality of resources for communication on the sidelink channel. The method further includes, at the first UE, based on receiving the paging indication message, monitoring the one or more resources for a message from the second UE.

Certain aspects of the subject matter described in this disclosure can be implemented in a method for wireless communication between a first UE and a second UE. The method generally includes, at the first UE, receiving, from the second UE, a message. The method generally includes, at the first UE, based on receiving the message, identifying, one or more resources of a common resource pool comprising a plurality of resources for communication on a sidelink channel. The method generally includes, at the first UE, transmitting, to the second UE, a paging indication message on the sidelink channel, the paging indication message indicating the one or more resources. The method generally includes, at the first UE, transmitting, to the second UE, a second message in the one or more resources.

Certain aspects of the subject matter described in this disclosure can be implemented in a first UE comprising a memory and a processor. The memory and the processor are configured to receive, from a second UE, a paging indication message on a sidelink channel, the paging indication message associating the first UE with one or more resources of a common resource pool comprising a plurality of resources for communication on the sidelink channel. The memory and the processor are further configured to, based on receiving the paging indication message, monitor the one or more resources for a message from the second UE.

Certain aspects of the subject matter described in this disclosure can be implemented in a first UE comprising a memory and a processor. The memory and the processor are configured to receive, from a second UE, a message. The memory and the processor are further configured to, based on receiving the message, identify, one or more resources of a common resource pool comprising a plurality of resources for communication on a sidelink channel. The memory and the processor are further configured to transmit, to the second UE, a paging indication message on the sidelink channel, the paging indication message indicating the one or more resources. The memory and the processor are further configured to transmit, to the second UE, a second message in the one or more resources.

Certain aspects of the subject matter described in this disclosure can be implemented in a first UE. The first UE generally includes means for receiving, from a second UE, a paging indication message on a sidelink channel, the paging indication message associating the first UE with one or more resources of a common resource pool comprising a plurality of resources for communication on the sidelink channel. The first UE further includes means for, based on receiving the paging indication message, monitoring the one or more resources for a message from the second UE.

Certain aspects of the subject matter described in this disclosure can be implemented in a first UE. The first UE generally includes means for receiving, from a second UE, a message. The first UE generally includes means for, based on receiving the message, identifying, one or more resources of a common resource pool comprising a plurality of resources for communication on a sidelink channel. The first UE generally includes means for transmitting, to the second UE, a paging indication message on the sidelink channel, the paging indication message indicating the one or more resources. The first UE generally includes means for transmitting, to the second UE, a second message in the one or more resources.

Certain aspects of the subject matter described in this disclosure can be implemented in a non-transitory computer-readable medium including instructions that when executed by a first UE, cause the first UE to perform a method for wireless communication between the first UE and a second UE. The method generally includes, at the first UE, receiving, from the second UE, a paging indication message on a sidelink channel, the paging indication message associating the first UE with one or more resources of a common resource pool comprising a plurality of resources for communication on the sidelink channel. The method further includes, at the first UE, based on receiving the paging indication message, monitoring the one or more resources for a message from the second UE.

Certain aspects of the subject matter described in this disclosure can be implemented in a non-transitory computer-readable medium including instructions that when executed by a first UE, cause the first UE to perform a method for wireless communication between the first UE and a second UE. The method generally includes, at the first UE, receiving, from the second UE, a message. The method generally includes based on receiving the message, identifying, one or more resources of a common resource pool comprising a plurality of resources for communication on a sidelink channel. The method generally includes transmitting, to the second UE, a paging indication message on the sidelink channel, the paging indication message indicating the one or more resources. The method generally includes transmitting, to the second UE, a second message in the one or more resources.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a base station.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIGS. 4A-4C illustrate diagrammatic representations of example vehicle to everything (V2X) systems, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
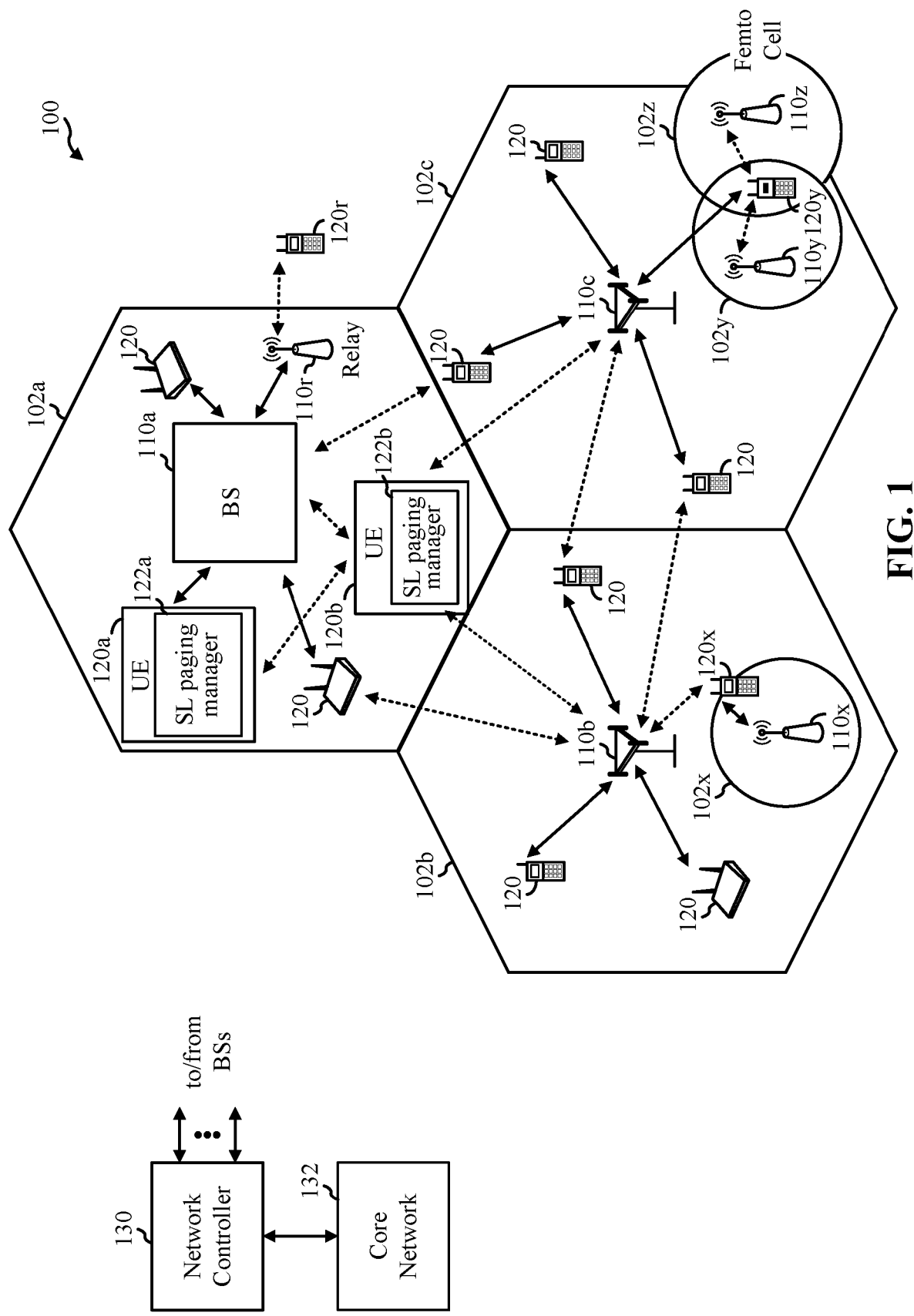
FIG. 1 is a block diagram conceptually illustrating an example telecommunications system, in accordance with certain aspects of the present disclosure.

A user equipment (UE) may exchange sidelink information (e.g., user data and control signaling) with other UEs directly and without the help (e.g., relaying) of a base station. This type of sidelink communication is often called peer-to-peer (also referred to as device-to-device or D2D) communication. An example of peer-to-peer communication includes vehicle to everything (V2X) communication where a vehicle may communicate with: another vehicle (referred to as vehicle to vehicle (V2V) communication), a UE of a pedestrian/person (referred to as vehicle to pedestrian (V2P) communication), a base station, a traffic control system, or the like.

Improving V2P sidelink communications may help protect the safety of pedestrians. For example, a first UE, such as a vehicle's UE (also referred to herein as a VUE) may send out one or more sidelink messages, such as warning messages, to a second UE, such as a pedestrian's UE (also referred to as a PUE), such as when the pedestrian is on a collision course with the vehicle (e.g., when the pedestrian comes within a certain threshold distance of the vehicle). It should be noted that though certain aspects are described with respect to a VUE sending one or more messages to a PUE, such aspects may similarly be applicable in other scenarios, such as any UE (e.g., transmitting (Tx) UE) sending a message to another UE (e.g., receiving (Rx) UE). Further, other types of messages may be transmitted, such as any message indicating an event detected by the Tx UE, such as one or more of: a potential collision between the Tx UE and the Rx UE, a right of way of the Tx UE, a speed of the Tx UE, a roadway hazard, a drawbridge state, a vehicle aspect (e.g., size, emergency, type of load, etc.) of the Tx UE, etc.

In order to receive these sidelink messages, however, in one scenario, the Rx UE may have to monitor the sidelink channel between the Tx UE and the Rx UE during certain time periods, which may occur periodically and be used for communicating sidelink messages between Tx UEs and Rx UEs. For example, the Rx UE may need to monitor the sidelink channel for each such time period, regardless of whether the Tx UE sends a sidelink message to the Rx UE during the given time period or not. That is, the Rx UE may have to monitor, for each time period, all time and/or frequency resources of a common resource pool (e.g., that may be used by several different sidelink devices) of the sidelink channel that occurs periodically to be able to receive the sidelink messages (e.g., warning) from the Tx UE. This may drastically increase the power consumption of the Rx UE.

Aspects of the present disclosure provide apparatuses, methods, processing systems, and computer readable mediums for an Rx UE to potentially reduce the time spent monitoring the sidelink channel for sidelink messages, and also potentially reduce the frequency bandwidth over which the Rx UE monitors the sidelink channel for sidelink messages. In certain aspects, the Rx UE, based on the techniques discussed herein monitors only within those time periods for which the Tx UE has a sidelink message to send to the Rx UE. Further, for each such time period, the Rx UE may only monitor a specific portion (e.g., one or more time-frequency resources) of the sidelink channel to receive sidelink messages from a Tx UE. That is, instead of, for a given time period, monitoring the entire common resource pool (e.g., used by different Tx UEs/Rx UEs) on the sidelink channel, in some aspects, the Rx UE may monitor, for the given period, a particular set of one or more resources (e.g., time-frequency resources, such as physical resource blocks) on the sidelink channel for potential messages sent to the Rx UE by a Tx UE.

In some aspects, the Tx UE may send a paging indication message to the Rx UE that indicates there is a sidelink message for the Rx UE during a given time period associated with the paging indication message. The paging indication message may further specify particular time-frequency resources on the sidelink channel for the given time period that one or more sidelink messages for the Rx UE are communicated on.

A Rx UE may monitor for a paging indication message during a paging time period dedicated to communication of paging indication messages from Tx UEs to Rx UEs. For example, the paging time period, like the time periods used for communicating sidelink messages, may occur periodically. For example, a corresponding paging time period may occur prior to a corresponding time period for communicating sidelink messages. A paging time period may be shorter than a time period for communicating sidelink messages. The Rx UE may monitor all frequency resources associated with the paging time period for a paging indication message, such as all frequencies of a sidelink channel.

If the Rx UE receives a paging indication message for the Rx UE during the paging time period, the paging indication message may indicate to the Rx UE which time-frequency resource(s) of the common resource pool to monitor to receive a sidelink message during a corresponding time period. Accordingly, in certain aspects, the Rx UE only monitors, for the corresponding time period, one or more time-frequency resources in the common resource pool for which it has received an indication of in one or more paging indications from one or more Tx UEs indicating that the Rx UE should monitor such one or more time-frequency resources in the common resource pool for the corresponding time period. In such aspects, the Rx UE does not monitor, for the corresponding time period, other time-frequency resources in the common resource pool for which it has not received an indication in a paging indication for the corresponding time period, thereby saving power consumption for monitoring resources of the common resource pool for messages. Further, as discussed herein, such paging indications and common resource pool resources may occur periodically, and thus if a Tx UE later has a warning to send to an Rx UE, it can provide a paging indication for a portion of the common resource pool resources for another time period.

Accordingly, in certain aspects, one or more sidelink Tx UEs, such as a vehicle, a roadside unit (RSU), etc., may use paging indication messages to indicate to one or more sidelink Rx UEs, such as a pedestrian, a vehicle, a radar speed gun, an RSU, etc., to monitor one or more specific resources of the common resource pool for receiving corresponding messages from the Tx UE(s), such as in a particular time period. For example, a first VUE may use a first paging indication message to indicate to a PUE to monitor a first set of resources in the common resource pool for receiving a message from the first VUE, while a second VUE may use a second paging indication message to indicate to the PUE to monitor a second set of resources in the common resource pool to receive a message from the second VUE. The PUE may therefore monitor both the first and second set of resources. As another example, a Tx UE (e.g., a draw bridge or a traffic light) may use a paging indication message to indicate to an Rx UE (e.g., a VUE) to monitor a specific portion of the common resource pool to receive a message (e.g., about the state of the drawbridge or the state of the traffic light) from the Tx UE. The PUE may therefore monitor the specific portion of the common resource pool to receive the message.

In some aspects, the Tx UE may explicitly indicate the time and frequency of the resources to the Rx UE. For example, the Tx UE may configure a value included in the paging indication message, such that a target Rx UE may be able to identify the time and frequency of any potential sidelink messages based on the value included in the paging indication message. In some other aspects, the Tx UE may indicate to the Rx UE which sidelink resources to monitor implicitly. For example, the Tx UE may use different sets of resources for transmitting the paging indication message, where each particular set of resources may be mapped to a different portion of the common sidelink resource pool where the Rx UE can receive sidelink messages from the Tx UE.

The following description provides examples of identifying resources for sidelink communications through sidelink paging, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 is a block diagram conceptually illustrating an example wireless communication network 100, in accordance with certain aspects of the present disclosure. For example, wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipments (UEs) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

As shown in FIG. 1, UEs 120a and 120b may include, among other modules/managers, sidelink (SL) paging managers 122a and 122b, respectively. UE 120a may directly communicate with UE 120b through a sidelink channel (e.g., a physical sidelink control channel (PSCCH) and/or a physical sidelink shared channel (PSSCH), etc.). For example, UEs 120a and 120b may exchange user data using a PSSCH between the UEs or may exchange control data using a PSCCH. UE 120a, as will be discussed in more detail below, may act as a Tx UE (e.g., a VUE carried in a vehicle), while UE 120b may act as an Rx UE (e.g., a PUE carried by a person/pedestrian).

For example, when PUE 120b is located within a certain distance of VUE 120a, VUE 120a may send a warning message (e.g., through a PSSCH) to PUE 120b (e.g., if VUE 120a has previously received the location and identification (ID) information of PUE 120*b*). To do so, SL paging manager 122*a* may transmit a paging indication message (or signal) to PUE 120*b* (e.g., to SL paging manager 122*b*) to indicate that an SL message (e.g., the warning message) may be found in a common resource pool of the sidelink channel. The paging indication message may be carried via dedicated resource(s) of the sidelink channel and may further include data or be transmitted on resources that specifies a particular portion (e.g., particular time(s) and frequency(ies)) of the sidelink channel for PUE 120*b* to monitor for receiving the SL message. SL paging manager 122*b* may start monitoring the specified resources for the potential SL message after receiving the paging indication message from SL paging manager 122*a*.

Figure 2:
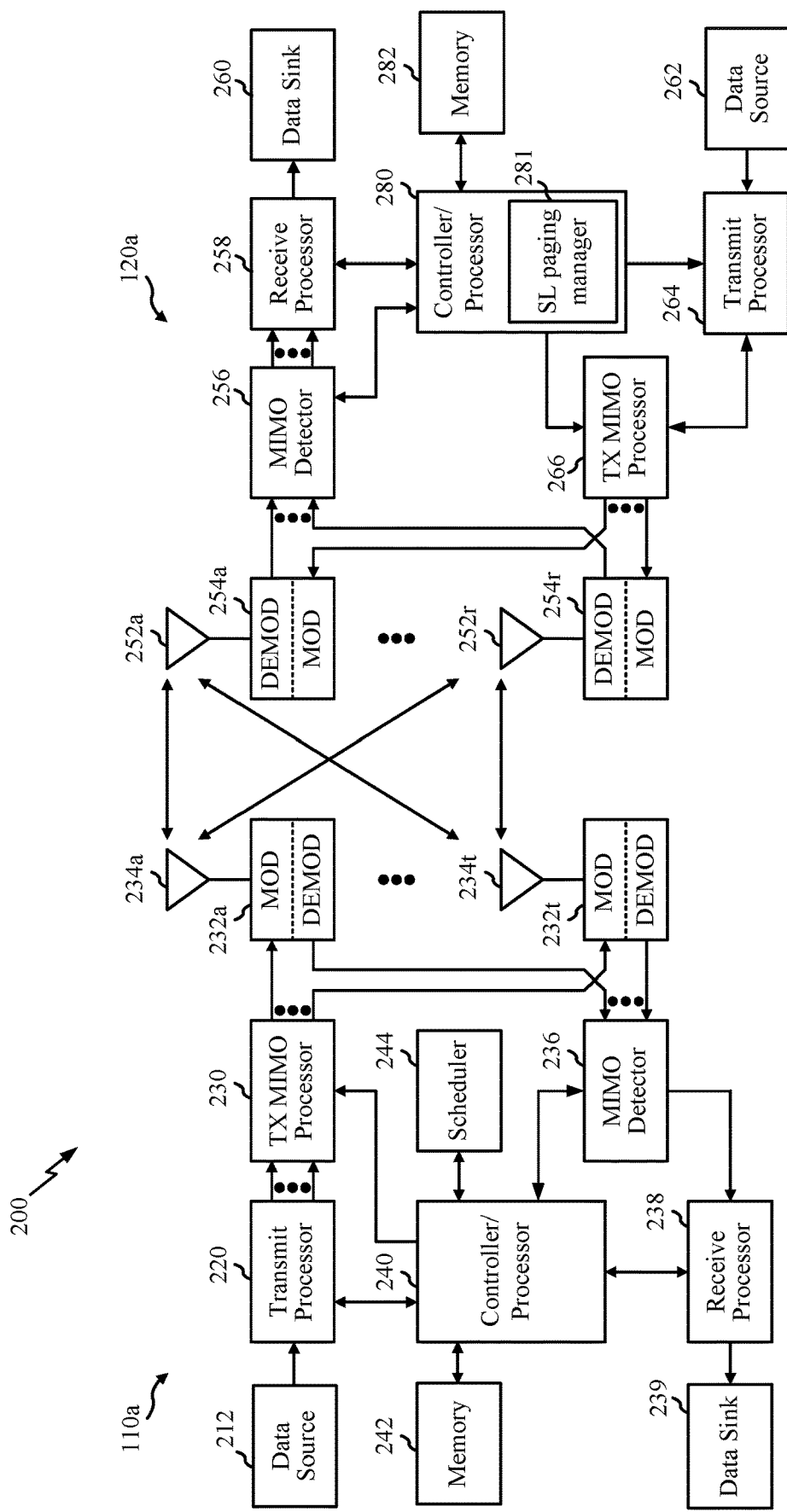
FIG. 2 is a block diagram conceptually illustrating a design of an example a base station (BS) and user equipment (UE), in accordance with certain aspects of the present disclosure.

FIG. 2 illustrates example components of BS 110*a* and UE 120*a* (e.g., the wireless communication network 100 of FIG. 1), which may be used to implement aspects of the present disclosure.

At the BS 110*a*, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120*a*, the antennas 252*a*-252*r* may receive the downlink signals from the BS 110*a* and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120*a* to a data sink 260, and provide decoded control information to a controller/processor 280.

On the uplink, at UE 120*a*, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM, etc.), and transmitted to the BS 110*a*. At the BS 110*a*, the uplink signals from the UE 120*a* may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 280 of the UE 120*a* may have an SL paging manager 281 configured for transmitting/receiving paging indication messages that may indicate (e.g., to a PUE) specific resource(s), such as one or more physical resource blocks (PRBs) in a sidelink common resource pool to monitor for receiving SL messages, according to aspects described herein. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
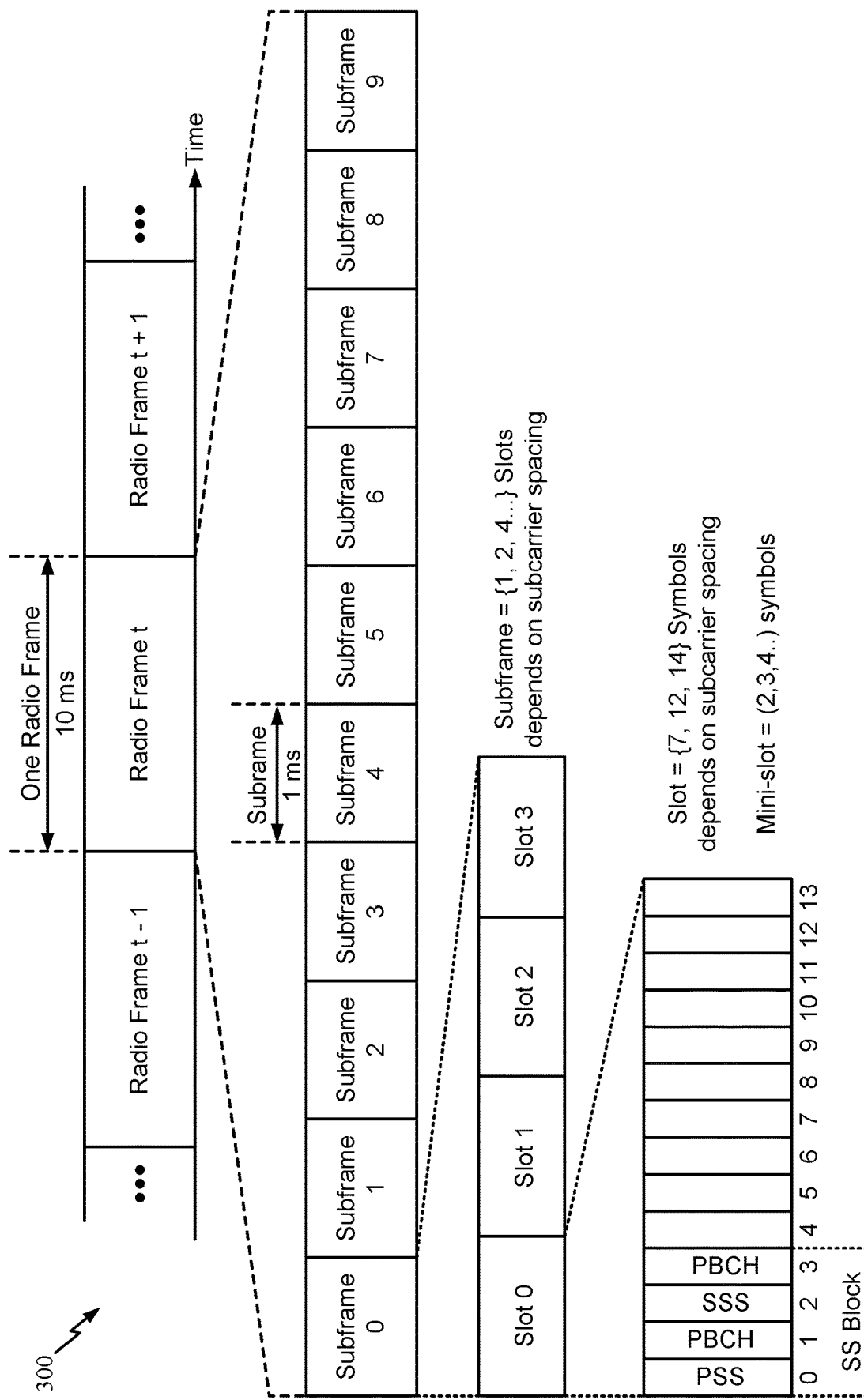
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, while the SS may provide the CP length and frame timing. The PSS and SSS may provide the cell identity. The PBCH carries some basic system information, such as downlink system bandwidth, timing information within radio frame, SS burst set periodicity, system frame number, etc.

The SSBs may be organized into SS bursts to support beam sweeping. Further system information, such as remaining minimum system information (RMSI), system information blocks (SIBs), other system information (OSI) may be transmitted on a physical downlink shared channel (PDSCH) in certain subframes. The SSB may be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets may be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a, as shown in FIG. 1) to another subordinate entity (e.g., UE 120b) without relaying that communication through the scheduling entity (e.g., BS 110), even though the scheduling entity may be utilized for scheduling and/or control purposes. In some examples, the sidelink signals may be communicated using a licensed spectrum (unlike wireless local area networks, which typically use an unlicensed spectrum). One example interface used for sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling, such as sidelink resource configurations, paging indication messages, and other parameters used for data transmissions, and the PSSCH may carry the data transmissions, such as sidelink messages. The PSFCH may carry sidelink feedbacks, such as distance-based and/or non-distance-based HARQ feedbacks related to data transmissions between two or more UEs that are in direct communication with each other.

FIG. 4A, FIG. 4B, and FIG. 4C show diagrammatic representations of example V2X systems, in accordance with some aspects of the present disclosure. For example, the vehicles shown in FIGS. 4A-4C may perform data transmissions via sidelink channels, as described herein.

The V2X systems that are shown in FIG. 4A and FIG. 4B provide two complementary transmission modes. A first transmission mode, shown by way of example in FIG. 4A, may involve direct communications (may also be referred to as sidelink communications) between participants in proximity to one another in a local area. Sidelink transmissions by the UEs (e.g., Vehicles 402 and 404, or RSU$^2$ (e.g., traffic light) 410) may be implemented over a PC5 interface (e.g., a wireless communication interface between a first UE and a second UE). A second transmission mode, shown by way of example in FIG. 4B, may involve network communications through a network, which may be implemented over a Uu interface (e.g., a wireless communication interface between a radio access network (RAN) and a UE).

Referring to FIG. 4A, a V2X system 400 (e.g., vehicle to vehicle (V2V) communications) is illustrated with two vehicles 402, 404. The first transmission mode allows for direct communication between different participants in a given geographic location. As illustrated, a vehicle can have a wireless communication link 406 with a UE of an individual (e.g., as part of V2P communication) through a PC5 interface. Communications between the vehicles 402 and 404 may also occur through a PC5 interface 408. In a like manner, communication may occur from a vehicle 402 to other highway components (e.g., highway component 410), such as a traffic signal or sign (V2I) through a PC5 interface 412. With respect to each communication link illustrated in FIG. 4A, two-way communication may take place between elements, therefore each element may be a transmitter and a receiver of information.

The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed and/or unlicensed spectrum, thus any vehicle with an equipped system may access a common frequency and share information. Such harmonized/common spectrum operations may allow for safe and reliable operations.

FIG. 4B shows a V2X system 450 for communication between a vehicle 452 and a vehicle 454 through a network entity 456. These network communications may occur through discrete nodes, such as a BS (e.g., the BS 110a shown in FIG. 1), that sends and receives information to and from (or relays information between) vehicles 452, 454. The network communications through vehicle to network (V2N) links 458 and 460 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

FIG. 4C shows a V2P system 490 for communication between a VUE 492 and a PUE 494. As shown in the figure, when VUE 492 determines that PUE 494 is within a threshold proximity, VUE 492 may transmit paging indication message(s) (e.g., through dedicated V2P resources, as will be described below) to PUE 494. As an example, there could be preconfigured time/frequency resources where the PUEs can transmit P2V messages through which the VUE may infer the presence of the PUEs. The paging indication messages may include data and/or be transmitted on resources indicative of (i) PUE's identification and/or (ii) one or more time-frequency resources (e.g., PRBs) in the sidelink channel that may carry sidelink message(s) for the PUE.

After determining that the paging indication message transmitted is for PUE 494 (e.g., based on the identification data), PUE 494 may monitor the indicated resources (e.g., instead of the entire common resource pool for the associated time period for which the paging is transmitted) for receiving the potential sidelink message(s) from VUE 492. The sidelink message(s) may indicate to PUE 494 that it is getting too close to a vehicle carrying VUE 492. For example, the sidelink message(s) sent by VUE 492 may indicate to the person carrying PUE 494 one or more warning notifications/alerts/events, based on the VUE detecting an event as discussed, such as a potential impact with the vehicle. It should be noted that a second VUE (not shown in the figure) may transmit another paging indication message to PUE 494. Accordingly, the PUE 494 may additionally monitor one or more other time-frequency resources in the sidelink channel indicated by the other paging indication message.

For example, VUE 402 may transmit a paging indication message to VUE 404 to indicate to the VUE 404 to monitor a first set of resources in the common resource pool of a sidelink channel for receiving potential message(s) from the VUE 402 (e.g., to keep driving on the right lane because an ambulance is approaching). At the same time, RSU$^2$ 410 (e.g., a traffic light) may transmit another paging message to the same VUE 404 to indicate to the VUE 404 to monitor a second set of resources in the common resource pool of the sidelink channel for receiving potential message(s) from the RSU$^2$ 410 (e.g., to be prepared to stop because the traffic light is about to turn red). As such, the VUE 404 may monitor the first set of resources for any potential message sent by the VUE 402 and may monitor the second set of resources for any potential message sent by the RSU$^2$ 410.

Figure 5:
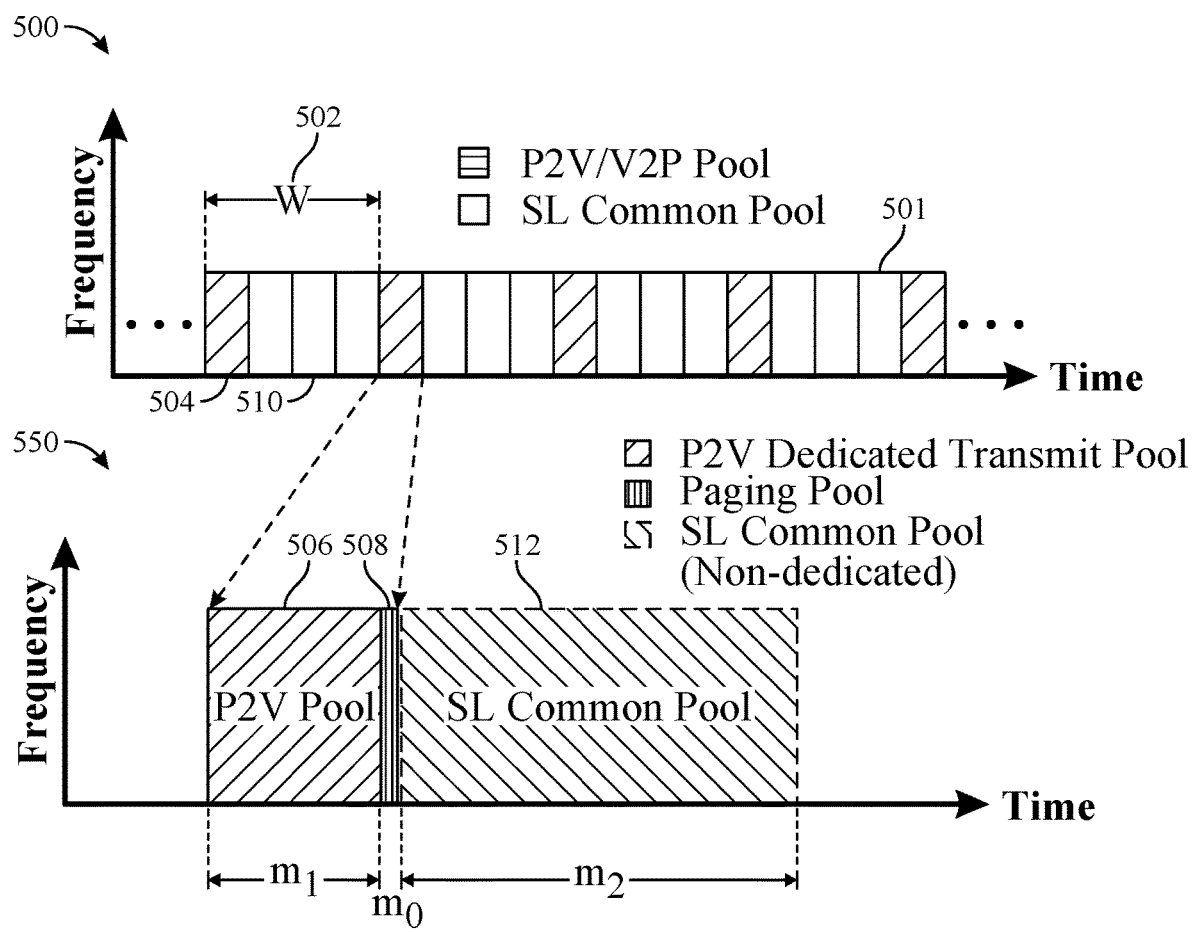
FIG. 5 is a time-frequency diagram illustrating different resource pools in a pedestrian to vehicle/vehicle to pedestrian (P2V/V2P) communication channel, in accordance with certain aspects of the present disclosure.

FIG. 5 is a time-frequency diagram illustrating different resource pools in a P2V/V2P communication channel, in accordance with certain aspects of the present disclosure. In graph 500, a number of time-frequency resources 501 are shown for communication. The frequency bandwidth of the time-frequency resources 501 may correspond to the frequency bandwidth of a sidelink channel. Though the frequency resources are shown as contiguous in frequency, it should be noted that the frequency resources may not be contiguous in frequency in certain aspects. The time-frequency resources 501 are divided into time periods W 502 that occur periodically. Each time period W 502 is divided into a P2V/V2P pool 504 and an SL common pool 510. The P2V/V2P pool 504 corresponds to time-frequency resources (e.g., one or more slots spanning one or more subchannels) dedicated for use in P2V/V2P communication (e.g., between VUEs and PUEs). The SL common pool 510 corresponds to time-frequency resources (e.g., one or more slots spanning one or more subchannels) that can be used for any communications (e.g., any sidelink communications). Accordingly, P2V/V2P pools are time-division multiplexed with SL common pools.

The graph 550 in FIG. 5 shows in more detail the components of a dedicated P2V/V2P pool 504. Though the frequency resources are shown as contiguous in frequency, it should be noted that the frequency resources may not be contiguous in frequency in certain aspects. As shown, P2V/V2P pool 504 is divided into dedicated P2V pool 506 resources and dedicated V2P paging pool 508 resources. In some aspects, P2V pool 506 resources may be used (e.g., for an m1 time duration) by PUEs only for transmission. That is, the resources in P2V pool 506 may be dedicated to PUEs transmissions. In some aspects, V2P paging pool 508 resources may be dedicated to VUEs to use (e.g., for an m0 time duration, e.g., m0 being shorter than m1) for transmitting paging indication messages, in which a VUE may indicate to a PUE whether there is a sidelink message (e.g., in SL common pool 510) for the PUE or not. An SL common pool 510 may be used by both PUEs and VUEs (e.g., for an m2 time duration, e.g., m2 being longer than m1). The PUEs may monitor SL pool 510 for potential sidelink messages sent by the VUEs (e.g., as indicated in a paging indication message). In certain aspects, the resources for the VUEs sidelink messages in SL common pool 510 may be configured to include the whole bandwidth, in which case, in certain cases the PUEs may decode all of the subchannels, or they may be configured to include only on a specific set of time-frequency resources.

As described above, in some aspects of the present disclosure, a VUE may specify a corresponding particular set of resources for each of one or more PUEs to monitor on the sidelink channel for sidelink messages that may be sent by the VUE. For example, the VUE may specify different one or more time-frequency resources for individual PUEs, for different sets of PUEs, not specify resources for certain PUEs, etc. In some aspects, the VUE may use the paging indication message for this purpose. The paging indication message may indicate to one or more PUEs whether there is a sidelink message in the common resource pool for those one or more PUEs. In some aspects, the VUE may explicitly indicate the time and frequency of the resources to the PUE (e.g., as will be described below, with reference to FIG. 8). In some other aspects, the VUE may indicate to a PUE which sidelink resources to monitor implicitly (e.g., as will be described below, with reference to FIG. 9).

Figure 6:
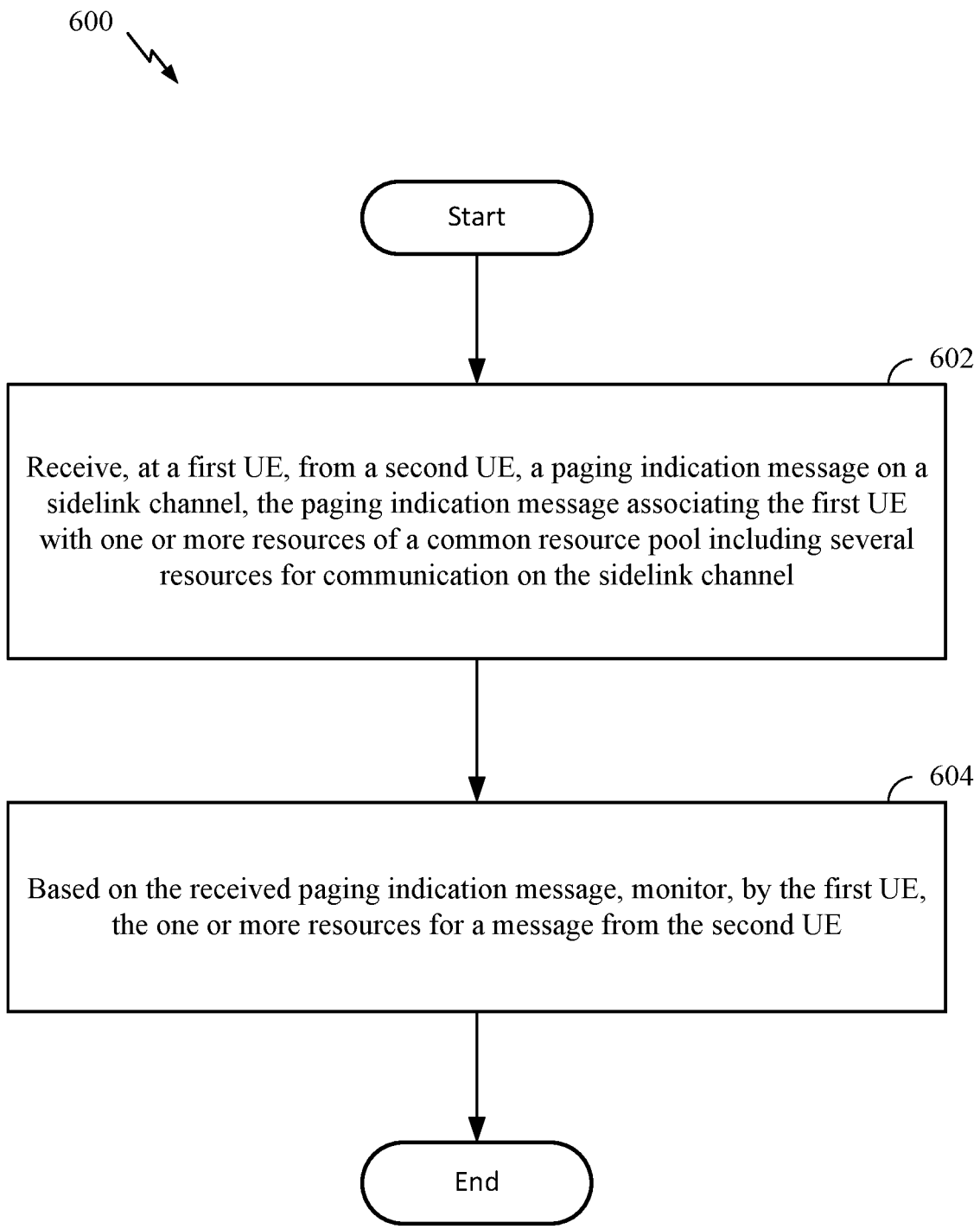
FIG. 6 is a flowchart illustrating example operations for monitoring a specific set of one or more resources using a received paging indication message, in accordance with certain aspects of the present disclosure.

FIG. 6 is a flowchart illustrating example operations 600 for monitoring a specific set of one or more resources using a received paging indication message, in accordance with certain aspects of the present disclosure. Operations 600 may be performed, for example, by a UE (e.g., such as UE 120*a* in the wireless communication network 100, as shown in FIG. 1). Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 600 may begin, at 602, by receiving, at a first UE (e.g., associated with a person, such as a PUE), from a second UE (e.g., associated with a vehicle, such as a VUE), a paging indication message on a sidelink channel, the paging indication message associating the first UE with one or more resources of a common resource pool including several resources for communication on the sidelink channel. In some aspects, in addition to data identifying the first UE as the recipient of the message, the paging indication message may include a value that maps to the one or more resources (e.g., one or more physical resource blocks (PRBs)) and is associated with the data identifying the first UE. In some aspects, the paging indication message may include data identifying one or more additional UEs as recipients of the message, and corresponding one or more values that each map to one or more resources (e.g., one or more PRBs) and are associated with the corresponding data identifying the corresponding UE, Operations 600 may then continue by, based on the received paging indication message, monitoring, at 604, by the first UE, the one or more resources for a message from the second UE. That is, instead of monitoring the entire sidelink common pool, the first UE may monitor only the time-frequency resources (e.g., PRBs) that are identified by the paging indication message for receiving a potential message from the second UE. In some aspects, before receiving the paging indication message, the first UE may transmit a message to the second UE using a dedicated resource pool on the sidelink channel (e.g., P2V pool 506, with reference to FIG. 5). The message may include data that indicates, at least, a location of the first UE and an identifier of the first UE. The location data may be used by the second UE to determine the proximity of the first UE and the identification data may be used in the paging message to target the first UE as the recipient of the message. The process may then end.

Figure 7:
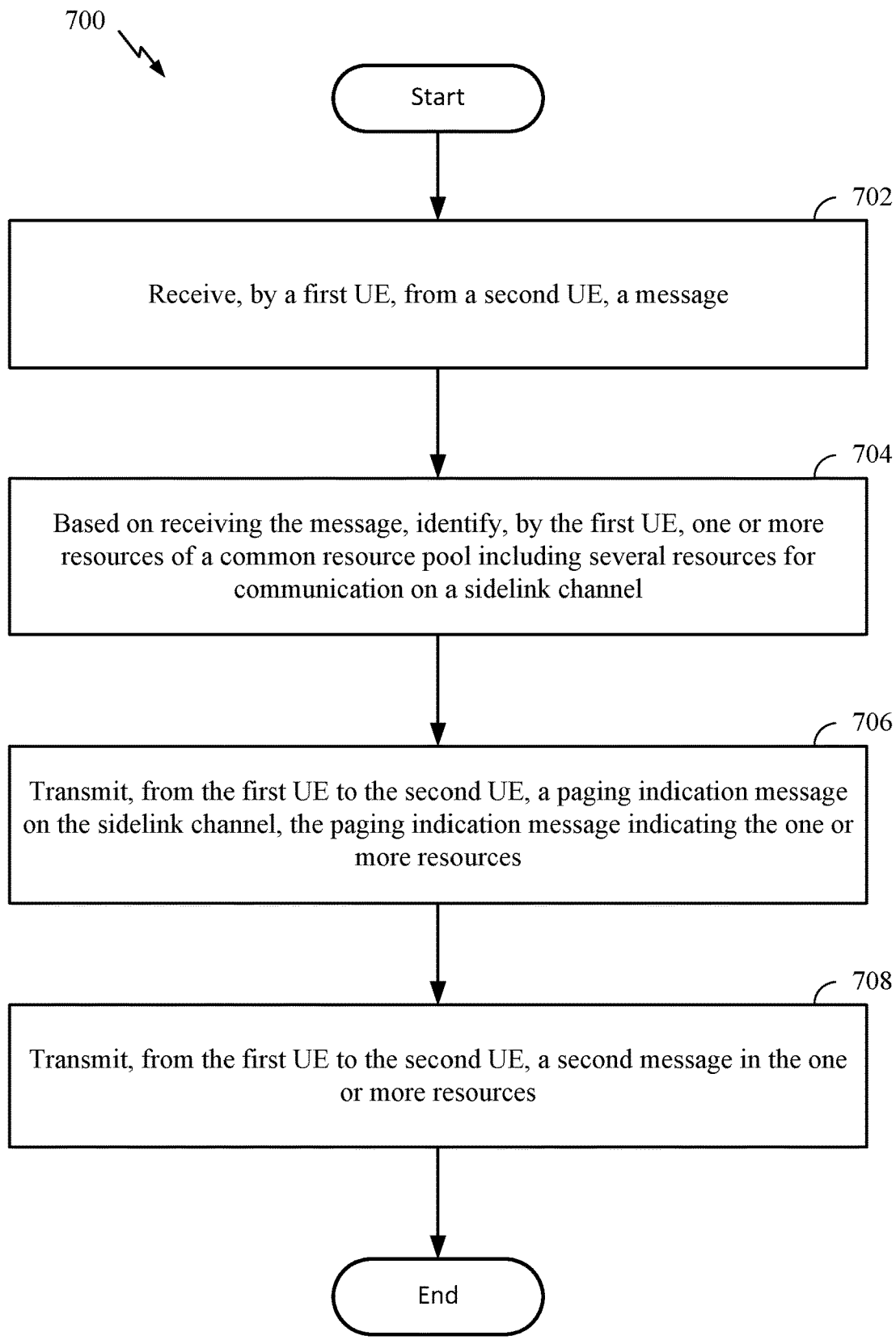
FIG. 7 is a flowchart illustrating example operations for indicating a specific set of one or more resources to monitor using a paging indication message, in accordance with certain aspects of the present disclosure.

FIG. 7 is a flowchart illustrating example operations 700 for indicating a specific set of one or more resources to monitor using a paging indication message, in accordance with certain aspects of the present disclosure. Operations 700 may be performed, for example, by a UE (e.g., such as UE 120b in the wireless communication network 100, as shown in FIG. 1). Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 700 may begin, at 702, by receiving, by a first UE (e.g., associated with a vehicle, such as a VUE), from a second UE (e.g., associated with a person, such as a PUE), a message. For example, the message may include a basic safety message. The message may include data that identifies the second UE (e.g., second UE's ID) and other data, such as the location of the second UE. As described above, the second UE may use the dedicated P2V pool for sending this message.

At 704, Operations 700 may, based on the received message, identify, by the first UE, one or more resources of a common resource pool including several resources for communication on a sidelink channel. For example, the first UE may perform a sidelink channel sensing to identify the time-frequency resources in the sidelink common pool that are available to page and/or send sidelink messages to the second UE.

Operations 700 may then transmit, at 706, from the first UE to the second UE, a paging indication message on the sidelink channel that indicates the one or more available resources for carrying a sidelink message from the first UE. For example, the paging indication message may be mapped to one or more particular time-frequency resources in the SL common pool resources. This way, the second UE does not have to continuously monitor the entire bandwidth during the whole transmission time of the SL common pool. Instead, the second UE may monitor the sidelink channel on a specific bandwidth(s) and for a specific time period(s) only (e.g., to receive any subsequent messages sent by the first UE).

Operations 700 may transmit, at 708, from the first UE to the second UE, a second message in the one or more resources. For example, the first UE may transmit the second message when the first UE determines that the second UE is within a threshold distance of the vehicle and there is a risk of impact. The process may then end.

Figure 8:
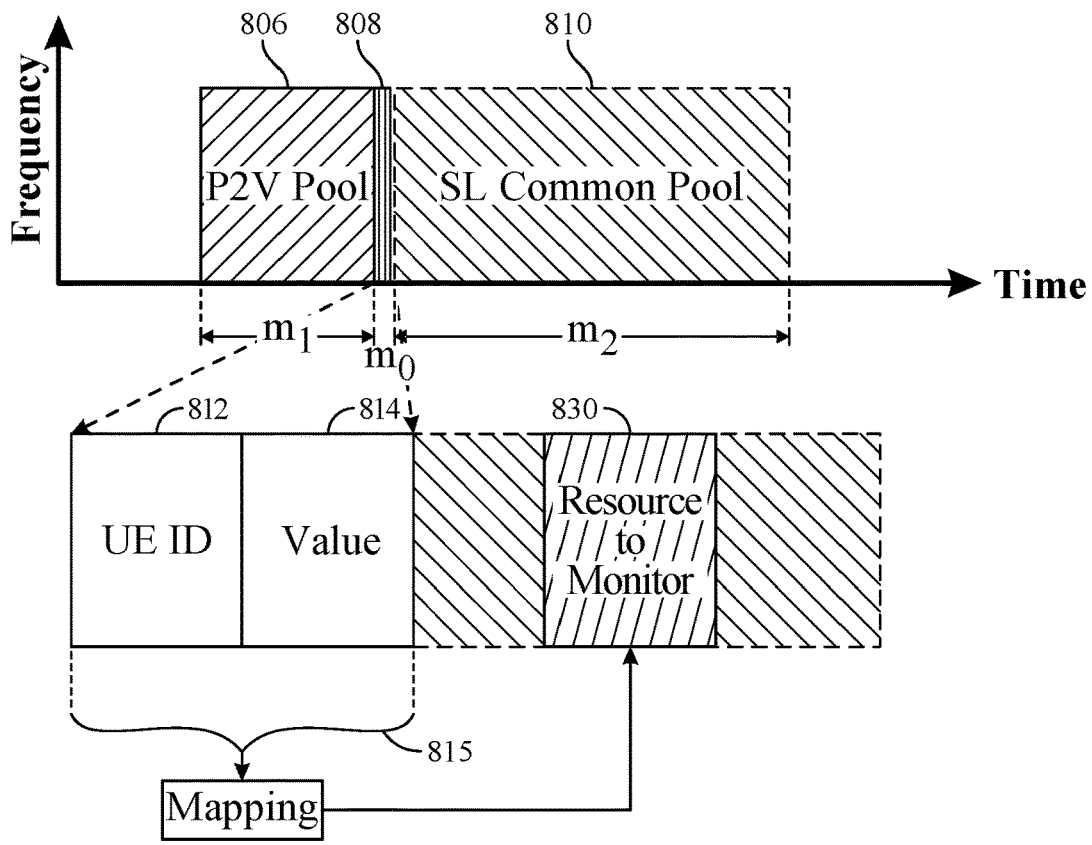
FIG. 8 is a time-frequency diagram illustrating a sidelink paging indication message carrying data that explicitly maps to particular time-frequency resources in a sidelink common pool, in accordance with certain aspects of the present disclosure.

FIG. 8 is a time-frequency diagram illustrating a sidelink paging indication message 815 carrying data that explicitly maps to particular time-frequency resources in a sidelink common pool 810, in accordance with certain aspects of the present disclosure. Like shown in FIG. 5, a P2V/V2P pool includes dedicated P2V pool 806 and dedicated V2P paging pool 808. The P2V/V2P pool is followed by SL common pool 810. Further, a paging indication message 815 is shown transmitted in the V2P paging pool 808. The paging indication message 815 includes a UE ID 812 and/or a value 814 (e.g., a random seed corresponding to a sequence (e.g., of bits)). The UE ID 812 and/or a value 814 may map to one or more resources 830 that the UE receiving the paging indication message 815 monitors for sidelink messages.

More specifically, in some aspects, the time-frequency resources 830 that a Rx UE may monitor in the SL common pool 810 may depend on a combination of value 814 that the Tx UE sends to the Rx UE and the Rx UE's ID. The value 814 may be sent along with or in the paging indication message 815 in the paging pool 808 (e.g., in one or more resources in paging pool 808). The Rx UE may use value 814 along with its UE ID to monitor only a portion (e.g., time-frequency resources 830) of SL common pool 810 to consume power efficiently.

In some aspects, the Rx UE may use a table (e.g., configured to the Rx UE, such as using radio resource control (RRC) signaling) to map the value 814 to the time-frequency resources 830 in the SL common pool 810. For example, the table may specify, for each value (e.g., of a random seed), the starting slot, the starting PRBs in each slot, and the number of slots/number of consecutive PRBs to monitor. For example, if the value 814 is 1, the table may indicate that the time-frequency resources 830 may include PRBs 10, 11, and 12 in the fourth slot. In another example, if the value 814 is 2, the table may indicate that the time-frequency resources 830 may include PRB 2 in the fifth and sixth slots. In another example, if the value 814 is 3, the table may indicate that the time-frequency resources 830 may include PRBs 4, 5, and 6 in the fourth, fifth, and sixth slots.

In some aspects, a Tx UE may derive the value 814 to be sent to the Rx UE in the paging indication message 815. For example, the mapping function from the UE-ID and the value 814 to a monitoring resource 830 in the SL common pool 810 may be calculated based on a formula "(UE.ID+value) mod N", where N may represent the number of PRBs in the paging pool 808 (e.g., containing m0 slots). The mod (or modulo) operation finds the remainder of division of (UE.ID+value) divided by N. As the Tx UE knows the ID of the Rx UE, and the value of N, the Tx UE may derive the value for a specific time-frequency resource 830 in the SL common pool 810 where the Tx UE intends to transmit a message to the Rx UE. The Tx UE may then transmit the derived value 814 in the PRBs allocated to the paging pool 808.

In some aspects, the Tx UE may choose a Rx UE specific paging indication sequence (e.g., the paging indication message 815) by cyclically shifting a common paging sequence by L (e.g., L being a positive number) based on the ID of the Rx UE. For example, the Tx UE may cyclically shift the common paging sequence by "UE.ID mod M", where M is the total shifts possible. In some aspects, if X[n] represent the common paging sequence, the specific paging sequence may be obtained by the function "X[n−L] mod K], where K is the length of the common length sequence.

Figure 9:
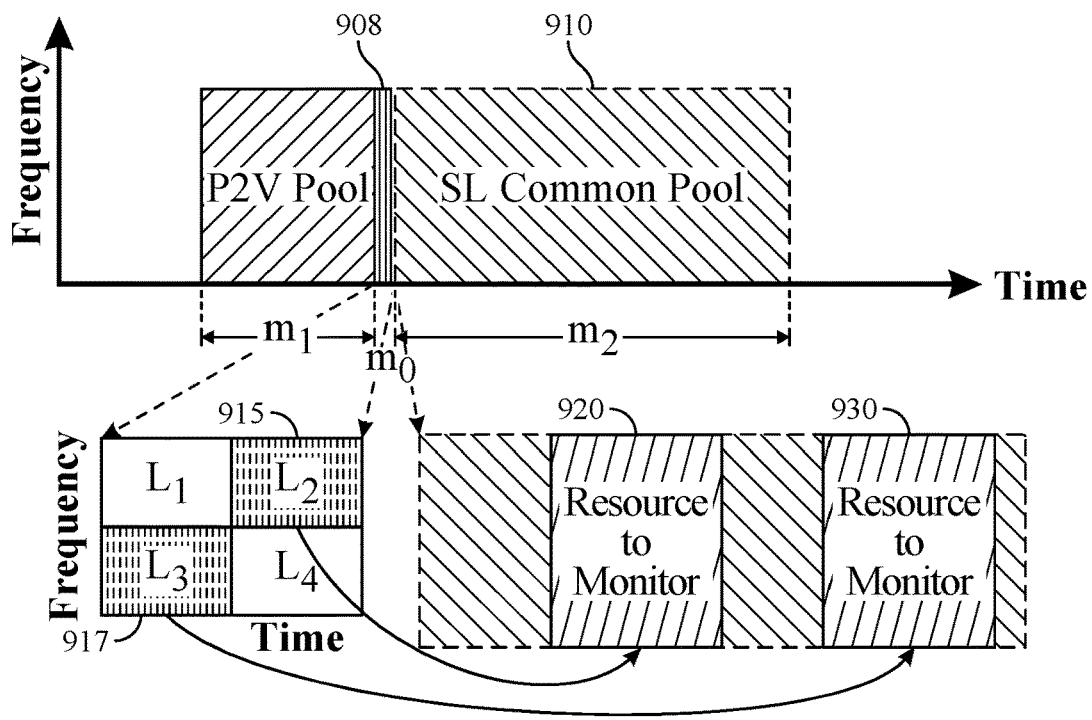
FIG. 9 is a time-frequency diagram illustrating a sidelink paging indication message that implicitly maps to particular time-frequency resources in a sidelink common pool, in accordance with certain aspects of the present disclosure.

FIG. 9 is a time-frequency diagram illustrating sidelink paging indication messages that implicitly map to particular time-frequency resources in a sidelink common pool, in accordance with certain aspects of the present disclosure. As shown in the figure, the resources 920 and 930 to monitor is the SL common pool 910 may be identified based on which resources are used for the paging indication messages 915 and 917 in paging pool 908. For example, based on the PRBs where the paging indication messages 915 and 917 are transmitted, the monitoring portions 920 and 930 of the SL common pool 910 may be different. Therefore, if the paging pool 908 is divided into M groups (M being a positive number), each group may be mapped to a set of PRBs in the SL common pool 910 where the Tx UE may transmit sidelink message(s).

In the illustrated example of FIG. 9, the resources of paging pool 808 are divided into 4 different groups (e.g., L1-L4). As such, there can be four different portions in the SL common pool 910 that can be identified by the paging pool 808. For example, if the Tx UE transmits a paging indication message 915 in time-frequency resource L2, the Rx UE determines that time-frequency resources 920 should be monitored to receive a potential SL message from the Tx UE. Similarly, if the Tx UE transmits the paging indication message 917 in time-frequency resource L4, the Rx UE may monitor time-frequency resources 930 in the SL common pool 910.

Figure 10:
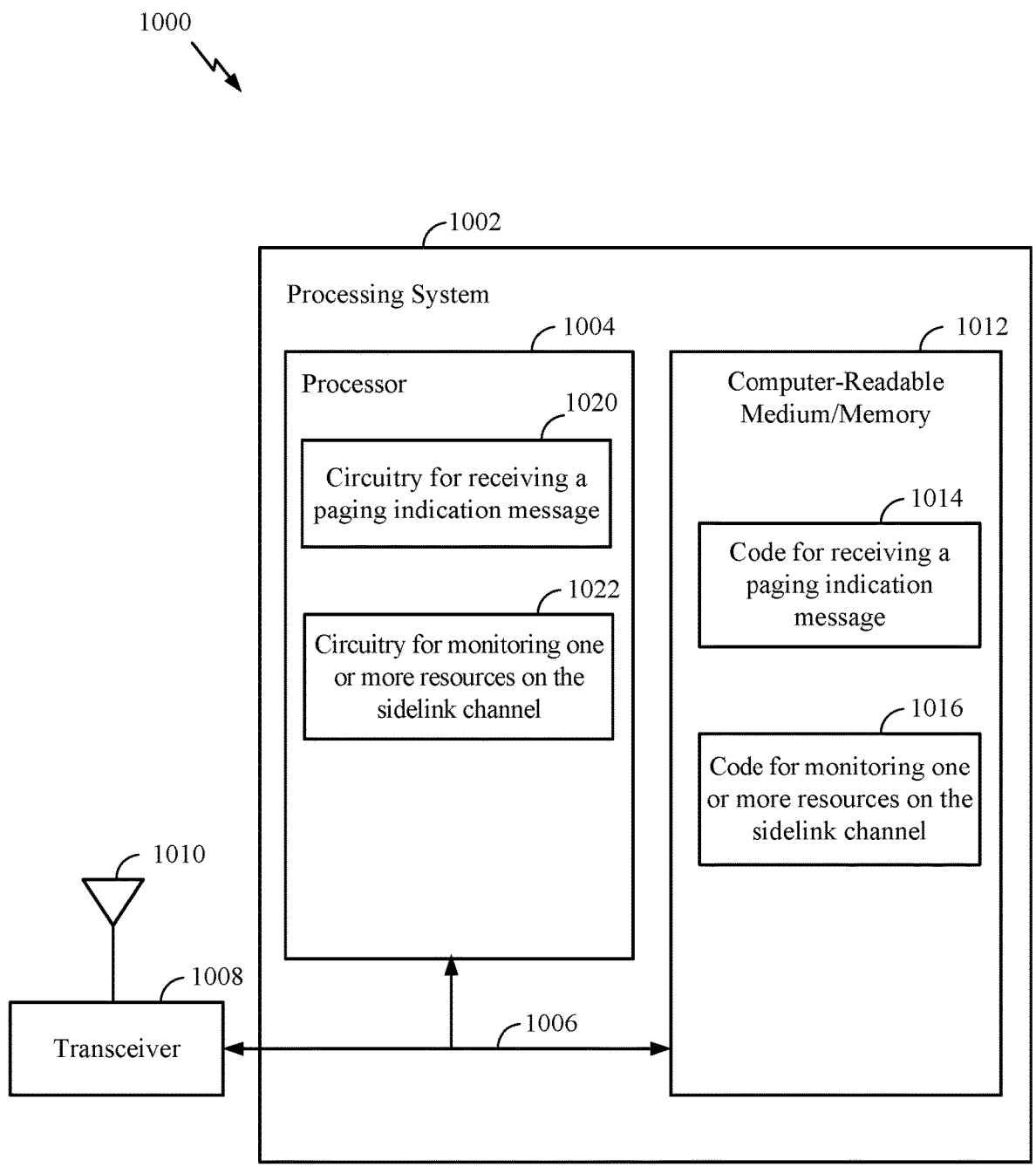
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIGS. 6-7. The communications device 1000 may include a processing system 1002 coupled to a transceiver 1008 (e.g., a transmitter and/or a receiver). The transceiver 1008 may be configured to transmit and receive signals for the communications device 1000 via an antenna 1010, such as the various signals as described herein. The processing system 1002 may be configured to perform processing functions for the communication device 1000, including processing signals received and/or to be transmitted by the communications device 1000.

The processing system 1002 may include a processor 1004 coupled to a computer-readable medium/memory 1012 via a bus 1006. In certain aspects, the computer-readable medium/memory 1012 may be configured to store instructions (e.g., computer-executable code) that when executed by the processor 1004, cause the processor 1004 to perform the operations illustrated in FIGS. 6-7, or other operations for performing the various techniques discussed herein for identifying resources in sidelink communications through sidelink paging. In certain aspects, computer-readable medium/memory 1012 may store code 1014 for receiving, at a first UE, from a second UE, a paging indication message on a sidelink channel, the paging indication message associating the first UE with one or more resources of a common resource pool comprising a plurality of resources for communication on the sidelink channel; and code 1016 for, based on receiving the paging indication message, monitoring, by the first UE, the one or more resources for a message from the second UE.

In certain aspects, the processor 1004 may have circuitry configured to implement the code stored in the computer-readable medium/memory 1012. The processor 1004 may include circuitry 1020 for receiving, at a first UE, from a second UE, a paging indication message on a sidelink channel, the paging indication message associating the first UE with one or more resources of a common resource pool comprising a plurality of resources for communication on the sidelink channel; and circuitry 1022 for, based on receiving the paging indication message, monitoring, by the first UE, the one or more resources for a message from the second UE.

Figure 11:
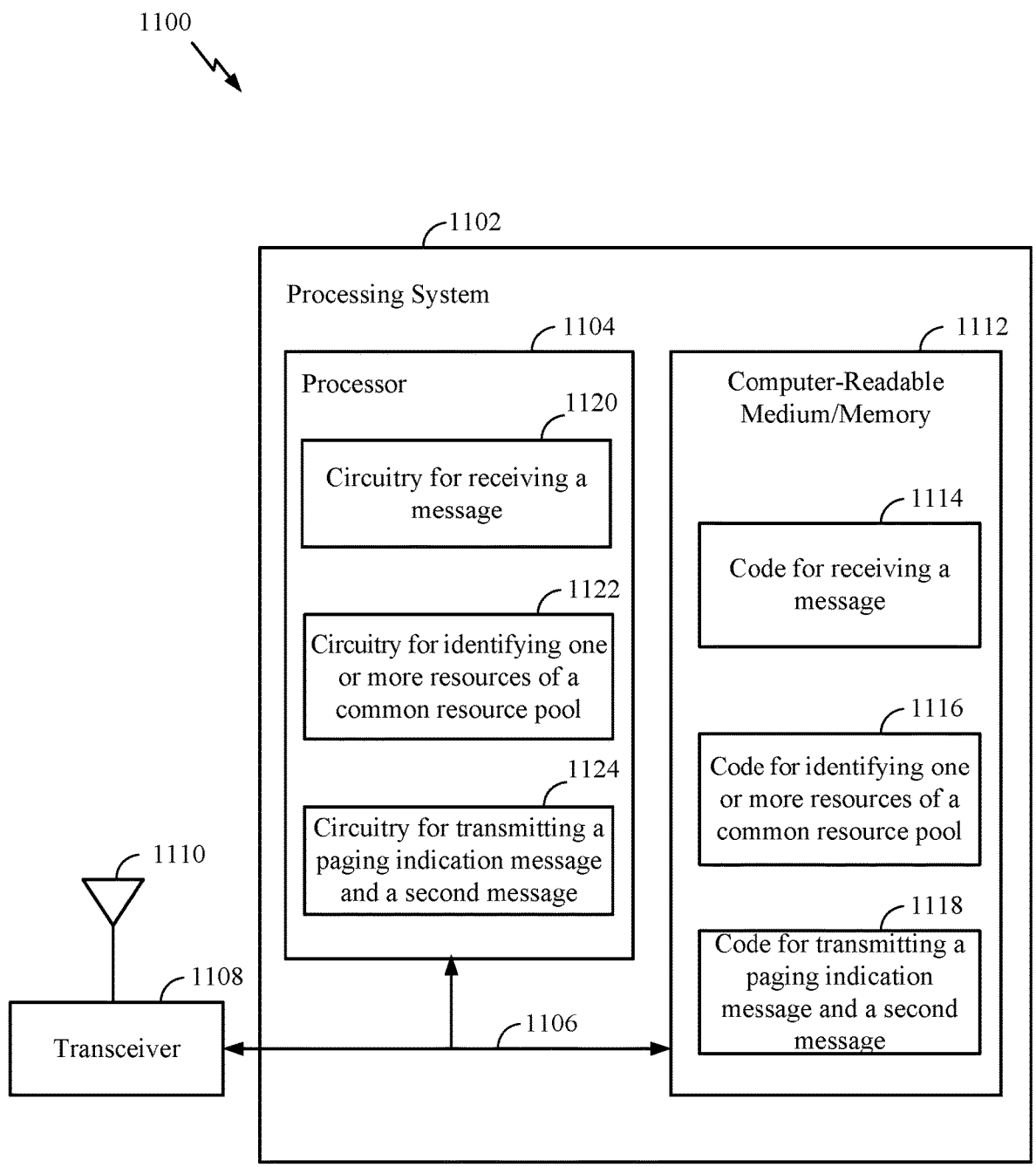
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 6-7. The communications device 1100 may include a processing system 1102 coupled to a transceiver 1108 (e.g., a transmitter and/or a receiver). The transceiver 1108 may be configured to transmit and receive signals for the communications device 1100 via an antenna 1110, such as the various signals as described herein. The processing system 1102 may be configured to perform processing functions for the communication device 1100, including processing signals received and/or to be transmitted by the communications device 1100.

The processing system 1102 may include a processor 1104 coupled to a computer-readable medium/memory 1112 via a bus 1106. In certain aspects, the computer-readable medium/memory 1112 may be configured to store instructions (e.g., computer-executable code) that when executed by the processor 1104, cause the processor 1104 to perform the operations illustrated in FIGS. 6-7, or other operations for performing the various techniques discussed herein for indicating resources in sidelink communications using sidelink paging. In certain aspects, computer-readable medium/memory 1112 may store code 1114 for receiving, at a first UE, from a second UE, a message; code 1116 for, based on receiving the message, identifying, by the first UE, one or more resources of a common resource pool comprising a plurality of resources for communication on a sidelink channel; and code 1118 for transmitting, from the first UE to the second UE, a paging indication message on the sidelink channel, the paging indication message indicating the one or more resources, and transmitting, from the first UE to the second UE, a second message in the one or more resources.

In certain aspects, the processor 1104 may have circuitry configured to implement the code stored in the computer-readable medium/memory 1112. The processor 1104 may include circuitry 1120 for receiving, at a first UE, from a second UE, a message; circuitry 1122 for, based on receiving the message, identifying, by the first UE, one or more resources of a common resource pool comprising a plurality of resources for communication on a sidelink channel; and circuitry 1124 for transmitting, from the first UE to the second UE, a paging indication message on the sidelink channel, the paging indication message indicating the one or more resources, and transmitting, from the first UE to the second UE, a second message in the one or more resources.

EXAMPLE EMBODIMENTS

Embodiment 1: A method for wireless communication between a first user equipment (UE) and a second UE, comprising, at the first UE: receiving, from the second UE, a paging indication message on a sidelink channel, the paging indication message associating the first UE with one or more resources of a common resource pool comprising a plurality of resources for communication on the sidelink channel; and based on receiving the paging indication message, monitoring the one or more resources for a message from the second UE.

Embodiment 2: The method of Embodiment 1, wherein the paging indication message includes a value that maps to the one or more resources and further comprising determining, at the first UE, the one or more resources based on the value.

Embodiment 3: The method of Embodiment 2, wherein determining the one or more resources is further based on an identifier of the first UE, wherein the paging indication message is addressed to the identifier of the first UE.

Embodiment 4: The method of any of Embodiments 2-3, wherein determining the one or more resources is based on at least one of a mapping function or a mapping table that maps at least the value to the one or more resources.

Embodiment 5: The method of Embodiment 1, wherein the paging indication message is received in one or more second resources, and further comprising determining, at the first UE, the one or more resources based on the one or more second resources.

Embodiment 6: The method of Embodiment 5, wherein determining the one or more resources is based on a mapping of resources used for paging indication messages to the plurality of resources of the common resource pool.

Embodiment 7: The method of any of Embodiments 1-6, wherein the one or more resources comprise one or more time-frequency resources.

Embodiment 8: The method of Embodiment 7, wherein the one or more time-frequency resources comprise one or more physical resource blocks.

Embodiment 9: The method of any of Embodiments 1-8, further comprising: receiving a second paging indication message on the sidelink channel from a third UE, the second paging indication message associating the first UE with one or more other resources of the common resource pool; and based on receiving the second paging indication message, monitoring the one or more other resources for a second message from the third UE.

Embodiment 10: The method of any of Embodiments 1-9, further comprising before receiving the paging indication message, transmitting a second message using a dedicated resource pool on the sidelink channel, wherein the second message includes data that indicates at least a location of the first UE and an identifier of the first UE.

Embodiment 11: The method of any of Embodiments 1-10, wherein the message indicates an event detected by the second UE.

Embodiment 12: The method of Embodiment 11, wherein the first UE is associated with a pedestrian and the second UE is associated with a vehicle, wherein the event indicates a potential collision between the vehicle and the pedestrian.

Embodiment 13: The method of Embodiment 11, wherein the first UE is associated with a vehicle and the second UE is associated with a roadside unit, wherein the event indicates a road hazard near the vehicle.

Embodiment 14: A method for wireless communication between a first user equipment (UE) and a second UE, comprising, at the first UE: receiving, from the second UE, a message; based on receiving the message, identifying, one or more resources of a common resource pool comprising a plurality of resources for communication on a sidelink channel; transmitting, to the second UE, a paging indication message on the sidelink channel, the paging indication message indicating the one or more resources; and transmitting, to the second UE, a second message in the one or more resources.

Embodiment 15: The method of Embodiment 14, wherein the paging indication message includes a value that maps to the one or more resources.

Embodiment 16: The method of Embodiment 15, further comprising determining the value based on at least one of a mapping function or a mapping table that maps at least the value to the one or more resources.

Embodiment 17: The method of Embodiment 16, wherein determining the value is further based on an identifier of the second UE.

Embodiment 18: The method of Embodiment 17, wherein the value is a common paging sequence cyclically shifted based on the identifier of the second UE.

Embodiment 19: The method of any of Embodiment 14, further comprising determining one or more second resources for transmitting the paging indication message based on the identified one or more resources.

Embodiment 20: The method of Embodiment 19, wherein determining the one or more second resources is based on a mapping of resources used for paging indication messages to the plurality of resources of the common resource pool.

Embodiment 21: The method of any of Embodiments 14-20, wherein the one or more resources comprise one or more time-frequency resources.

Embodiment 22: The method of Embodiment 21, wherein the one or more time-frequency resources comprise one or more physical resource blocks.

Embodiment 23: The method of any of Embodiments 14-22, wherein identifying the one or more resources comprises sensing the sidelink channel for available resources.

Embodiment 24: The method of any of Embodiments 14-23, wherein the message includes data that indicates at least a location of the second UE and an identifier of the second UE.

Embodiment 25: The method of Embodiment 24, wherein the second message indicates an event detected by the first UE.

Embodiment 26: The method of Embodiment 25, wherein the first UE is associated with a vehicle and the second UE is associated with a pedestrian, and further comprising determining, based on the location of the second UE, a possible impact between the second UE and the vehicle, wherein the identifying is further based on the possible impact, and wherein the event comprises the possible impact.

Embodiment 27: The method of Embodiment 25, wherein the second UE is associated with a vehicle and the first UE is associated with a roadside unit, wherein the event indicates a road hazard near the vehicle.

Embodiment 28: A first user equipment (UE) comprising: a memory; and a processor coupled to the memory, wherein the memory and the processor are configured to perform the method of one or more of Embodiments 1-27.

Embodiment 29: A first user equipment (UE) comprising: various means for performing the method of one or more of Embodiments 1-27.

Embodiment 30: A non-transitory computer-readable medium including instructions that when executed by a first user equipment (UE), cause the first UE to perform the method of one or more of Embodiments 1-27.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a first user equipment (UE), comprising:
one or more processors individually or collectively configured to execute instructions stored on one or more memories and cause the first UE to:
receive, from a second UE, a first message;
based on the reception of the first message, identify, one or more resources of a common resource pool, separate from a paging pool, comprising a plurality of resources for communication on a sidelink channel;
transmit, to the second UE, a paging indication message on the sidelink channel, the paging indication message indicating the one or more resources; and
transmit, to the second UE, a second message in the one or more resources.

2. The apparatus of claim 1, wherein the paging indication message includes a value that maps to the one or more resources.

3. The apparatus of claim 2, wherein the one or more processors are further configured to cause the first UE to determine the value based on an identifier of the second UE.

4. The apparatus of claim 3, wherein the value is a common paging sequence cyclically shifted based on the identifier of the second UE.

5. The apparatus first UE of claim 1, wherein the one or more processors are further configured to cause the first UE to determine one or more second resources for transmitting the paging indication message based on the identified one or more resources and a mapping of resources used for paging indication messages to the plurality of resources of the common resource pool.

6. The apparatus of claim 1, wherein the one or more resources comprise one or more time-frequency resources.

7. The apparatus of claim 1, wherein, in order to identify the one or more resources, the one or more processors are further configured to cause the first UE to sense the sidelink channel for available resources.

8. The apparatus of claim 1, wherein the first message includes data that indicates at least a location of the second UE and an identifier of the second UE.

9. The apparatus of claim 8, wherein the second message indicates an event detected by the first UE.

10. A method for wireless communication by a first user equipment (UE), comprising:
receiving, from a second UE, a first message;
based on the reception of the first message, identifying, one or more resources of a common resource pool, separate from a paging pool, comprising a plurality of resources for communication on a sidelink channel;
transmitting, to the second UE, a paging indication message on the sidelink channel, the paging indication message indicating the one or more resources; and
transmitting, to the second UE, a second message in the one or more resources.

11. The method of claim 10, wherein the paging indication message includes a value that maps to the one or more resources.

12. The method of claim 11, wherein determining the value is further based on an identifier of the second UE.

13. The method of claim 12, wherein the value is a common paging sequence cyclically shifted based on the identifier of the second UE.

14. The method of claim 10, further comprising determining one or more second resources for transmitting the paging indication message based on the identified one or more resources and a mapping of resources used for paging indication messages to the plurality of resources of the common resource pool.

15. The method of claim 10, wherein identifying the one or more resources comprises sensing the sidelink channel for available resources.

16. The method of claim 10, wherein the first message includes data that indicates at least a location of the second UE and an identifier of the second UE.

17. The method of claim 16, wherein the second message indicates an event detected by the first UE.

18. A non-transitory computer readable medium for wireless communication by a first user equipment (UE), comprising:
executable instructions that, when executed by one or more processors of an apparatus, cause the apparatus to:
receive, from a second UE, a first message;
based on the reception of the first message, identify, one or more resources of a common resource pool, separate from a paging pool, comprising a plurality of resources for communication on a sidelink channel;
transmit, to the second UE, a paging indication message on the sidelink channel, the paging indication message indicating the one or more resources; and
transmit, to the second UE, a second message in the one or more resources.

19. An apparatus for wireless communication at a first user equipment (UE), comprising:
- means for receiving, from a second UE, a first message;
- means for identifying, based on the reception of the first message, one or more resources of a common resource pool, separate from a paging pool, comprising a plurality of resources for communication on a sidelink channel;
- means for transmitting, to the second UE, a paging indication message on the sidelink channel, the paging indication message indicating the one or more resources; and
- means for transmitting, to the second UE, a second message in the one or more resources.

* * * * *